(12) United States Patent
Zureiqat

(10) Patent No.: US 8,862,593 B1
(45) Date of Patent: Oct. 14, 2014

(54) SYSTEM AND METHOD FOR CREATING, MANAGING, AND PUBLISHING AUDIO MICROPOSTS

(71) Applicant: Sowt International Ltd., Road Town (VG)

(72) Inventor: Hazem Zureiqat, Amman (JO)

(73) Assignee: Sowt International Ltd., Tortola (VG)

( * ) Notice: Subject to any disclaimer, the term of this patent is extended or adjusted under 35 U.S.C. 154(b) by 13 days.

(21) Appl. No.: 13/841,357

(22) Filed: Mar. 15, 2013

(51) Int. Cl.
*G06F 17/30* (2006.01)
*G11B 20/10* (2006.01)

(52) U.S. Cl.
CPC .... *G11B 20/10527* (2013.01); *G06F 17/30755* (2013.01)
USPC .......................................... 707/748; 704/276

(58) Field of Classification Search
USPC ............................ 707/748, 916; 704/200, 276
See application file for complete search history.

(56) References Cited

U.S. PATENT DOCUMENTS

| | | | |
|---|---|---|---|
| 2002/0103689 A1* | 8/2002 | Hornick et al. ................... 705/9 |
| 2004/0143841 A1* | 7/2004 | Wang et al. ...................... 725/32 |
| 2006/0293909 A1* | 12/2006 | Miyajima et al. ................ 705/1 |
| 2011/0082572 A1 | 4/2011 | Ramakrishnan et al. ....... 700/94 |
| 2012/0253492 A1 | 10/2012 | Andrews ......................... 700/94 |
| 2012/0253493 A1 | 10/2012 | Andrews ......................... 700/94 |
| 2012/0284649 A1 | 11/2012 | Levy ............................. 715/753 |
| 2012/0304072 A1* | 11/2012 | Mercuri et al. ............... 715/745 |

* cited by examiner

*Primary Examiner* — Ambresh Singh
(74) *Attorney, Agent, or Firm* — Pillsbury Winthrop Shaw Pittman LLP

(57) ABSTRACT

A system and method for creating, managing, and publishing audio microposts is provided. An audio micropost comprises a short audio segment recorded and/or captured based on voice, speech, and/or other sound, which may be shared with and/or published to subscribers and/or other users. The system may enable creating a discussion and playlist based on the audio microposts. The discussion may be generated by identifying and/or selecting an audio micropost that may pose a question and/or topic for a discussion and/or debate. The system may further enable granting the ability to participate in the discussion to a selected group of participants. The playlist of audio microposts may be created by adding individual posts into the playlist and/or by using hashtags and/or keywords to search for audio microposts of interest.

28 Claims, 6 Drawing Sheets

SYSTEM AND METHOD FOR CREATING, MANAGING, AND PUBLISHING AUDIO MICROPOSTS

FIELD OF THE INVENTION

The invention relates to systems and methods for creating, managing, and publishing audio microposts and creating a discussion and playlist based on the audio microposts.

BACKGROUND OF THE INVENTION

Microblogging is a modern communication medium that allows users to publish and/or broadcast short messages that can be accessed and/or viewed by subscribers and/or other users. These short messages used for microblogging are often referred as microposts. Microblogging has gained a significant amount of popularity in the recent years. For example, TWITTER provides a microblogging service which enables its users to exchange text-based microposts within social networks. However, various limitations exist with respect to how audio microposts can be effectively created, managed, and/or published within social networks.

Text-based microposts provide a quick and easy way to exchange and share information but are not very effective in conveying an author's emotions, feelings, attitudes, tone, and/or mood. Audio microposts created based on voice, speech, and/or other sound can provide an improved way of communicating short and expressive messages.

As such, what is needed is to be capable of creating, managing, and publishing audio microposts. These and other problems exist.

SUMMARY OF THE INVENTION

The invention relates to systems and methods for creating, managing, and/or publishing audio microposts. Another aspect of the invention relates to creating a discussion and playlist based on the audio microposts. An audio micropost comprises audio content with running time less than a predetermined time limit.

In some embodiments, the system may include a computer that facilitates creating, organizing, managing, and/or publishing audio microposts. The system may further enable granting the ability to participate in a discussion (e.g., posting a comment to an audio micropost) to a selected group of participants (hereinafter, "debaters list"). In some embodiments, the system may enable creating an audio micropost and managing the ability to participate in a discussion about a question and/or topic associated with the audio micropost based on the debaters list. The system may further enable creating a playlist of audio microposts by adding individual posts into the playlist and/or by using one or more playlist parameters. The one or more playlist parameters may be used to search for audio microposts to be added into the playlist and/or filter audio microposts into the playlist and/or out of the playlist. The playlist parameters may specify one or more metadata tags associated with audio microposts that should be used, individually or in combination, to search for audio microposts to be added into the playlist and/or filter audio microposts into the playlist and/or out of the playlist.

The computer may include one or more processors configured to perform some or all of a functionality of a plurality of modules. For example, the one or more processors may be configured to execute an audio micropost creation module, a discussion module, a playlist module, a communication module, a user interface module, and/or other modules. An author, subscriber, and/or other user may access the system via, for example, one or more interfaces (e.g., web pages) communicated from the computer to a client device, an application such as a mobile application executing on a client device that generates the interface based on information communicated from the computer, an agent running on the computer, and/or via other interfaces.

The audio micropost creation module may be configured to create an audio micropost, wherein the audio micropost comprises audio content with running time less than a predetermined time limit. The audio micropost creation module may automatically stop recording an audio input once the time limit is reached. The audio micropost creation module may receive an audio input such as voice, speech, and/or other sound via an audio capture device (e.g., microphone).

In some embodiments, the audio micropost creation module may tag the audio micropost with one or more metadata tags including identifications of the author, identifications of other users (e.g., users who are mentioned in the post, who participated in creating the post, etc.), date/time information (e.g., the date/time of creation, modification, and/or update, the date/time last played, etc.), geographic location information (e.g., a geotag), keywords, hashtags, title, description, run time length, file size, metadata related to popularity such as the number of "likes" and/or votes (e.g., the number of times the post was "liked" by other users), the number of listens (e.g., the number of time the post was played by other users), the number of comments, and/or other metadata. A plurality of audio microposts may be ranked and/or sorted based on any one or more of the metadata tags.

The discussion module may be configured to create a discussion based on a plurality of audio microposts. As used herein, the discussion may include a discussion thread which may comprise a series of audio microposts. The discussion may be related to a question, idea, subject matter, and/or other topics. The discussion may comprise a first audio micropost followed by one or more comments that may be created in the form of audio microposts (hereinafter, "comment posts"). The comment posts may be used to comment on and/or reply to the question posed in and/or the discussion topic related to the first audio micropost. As used herein, the first audio micropost may be referred to as a "topic post." In some embodiments, the discussion module may generate an invitation message that may invite subscribers and/or other users to add comments in the discussion. The recipients of the invitation message may listen to the topic post and/or other comment posts included in the discussion and/or create a comment post.

In some embodiments, the discussion module may be configured to manage user access control and/or an ability to add comment posts to the audio micropost, discussion thread, and/or discussion. The discussion may be classified as an open discussion and/or a closed discussion. The open discussion may open all audio microposts and/or other content of the discussion to subscribers and/or other users, allowing those users to freely access the discussion (e.g., listen to the posts in the discussion thread, repost a micropost from the discussion, "like" a micropost in the discussion, etc.). The users may also add comment posts to the open discussion. On the other hand, the closed discussion may restrict and/or limit the ability to add comment posts to the discussion to a specific group of users. While the ability to add comment posts may be restricted and/or limited to the specific group of users, one or more of the other access permissions (e.g., listen to the posts in the discussion thread, repost a micropost from the discussion, "like" a micropost in the discussion, etc.) may be granted to one or more other subscribers and/or other users. In some embodiments, the ability to add a comment post to the audio micropost may be disabled such that no users may leave comments for the audio micropost.

In some embodiments, the discussion module may be configured to create a debaters list that comprises a list of users who may be granted a permission to add comment posts to the closed discussion and/or an audience list that comprises a list of users who may be granted a permission to access the closed discussion (e.g., listen to the posts in the discussion thread, repast a micropost from the discussion, "like" a micropost in the discussion, etc.). In some embodiments, the discussion module may be configured to generate a private invitation message that may be communicated and/or sent to particular subscribers and/or users who are included in the debaters list and/or audience list. In some embodiments, the recipients of the private invitation message may be given the opportunity to accept or decline the invitation to the discussion. For example, once a user included in the debaters list accepts the invitation, the user may be automatically directed to the discussion and/or start recording a comment post which may be added to the discussion thread. In some embodiments, subscribers and/or other users who may be interested in joining in the closed discussion as a debater and/or as a member of the audience may request the user (e.g., moderator) who created and/or manages the discussion for the appropriate permission.

In some embodiments, the discussion module may be configured to keep track of and/or determine debater performance of one or more debaters in the discussion. Debater performance of a particular debater may be determined based on, for example, the number of "likes" and/or votes and/or other popularity metadata associated with the microposts created by the debater in that discussion. In some embodiments, the discussion module may be configured to determine which debater "wins" the debate based on the debater performance. For example, the debater who has the highest number of "likes" and/or votes may be selected as the winner of the debate.

The playlist module may be configured to create a playlist which may comprise a plurality of audio microposts. As used herein, a playlist may comprise a collection of audio microposts that are arranged in a particular order for playback. In a "Play-All" mode, all of the audio microposts in the playlist may be automatically played back in the particular order as arranged in the playlist. In this mode, the audio microposts in the playlist may be automatically played back-to-back.

In some embodiments, the playlist module may create a playlist by using one or more playlist parameters (e.g., using hashtags and/or keywords to search for audio micropost to be included in the playlist), by converting a discussion thread to a playlist, and/or by adding and/or removing individual audio microposts in and/or out of the playlist. The one or more playlist parameters may be used to search for audio microposts to be added into the playlist and/or filter audio microposts into the playlist and/or out of the playlist. The playlist parameters may specify one or more metadata tags associated with audio microposts that should be used, individually or in combination, to search for audio microposts to be added into the playlist and/or filter audio microposts into the playlist and/or out of the playlist.

In some embodiments, the playlist module may obtain a search query comprising one or more hashtags and/or keywords. Based on the search query, the playlist module may obtain search results containing a plurality of audio microposts that may include and/or be associated with one or more hashtags and/or keywords that may match and/or correspond to the search query.

In some embodiments, the playlist module may be configured to rank the plurality of audio microposts based on one or more ranking criteria and/or determine a playback order (e.g., a particular order in which the plurality of audio microposts in the playlist are arranged) based on the ranking. In the "Play-All" mode, the audio microposts may be played back-to-back according to the playback order. The audio microposts may be ranked and/or sorted based on the one or more ranking criteria which may specify one or more metadata tags that should be used, individually or in combination, to rank the posts. The one or more ranking criteria may include the relevance of a hashtag and/or keyword associated with individual microposts to the search query, a creation time associated with the individual microposts, and/or other ranking criteria defined based on other metadata tags. In some embodiments, the playlist module may create a playlist comprising the plurality of audio microposts that may be arranged and/or sorted based on the determined playback order.

In some embodiments, the playlist module may create a playlist based on a discussion. The playlist module may convert a discussion thread included in the discussion to a playlist such that the entire discussion may be played back-to-back in the "Play-All" mode. In some embodiments, a playlist may be created and/or an existing playlist may be updated by adding and/or removing individual audio microposts into and/or out of the playlist. In some embodiments, the playlist module may select and/or play the Top N highest ranked audio microposts of the playlist, wherein N is a predefined integer. For example, the playlist module may automatically play, in the "Play-All" mode, the Top 20 highest ranked audio microposts of the playlist.

In some embodiments, while the audio microposts included in a playlist created based on a search query (containing hashtags and/or keywords) are being played back in the "Play-All" mode, any newly created and/or recorded audio micropost that may correspond to a particular hashtag and/or keyword specified in the search query may be automatically added to the playlist, moved up towards the top of the playlist, and/or instantaneously played back. For example, a user may select the "Play-All" mode to start playing the audio microposts included in the playlist which has been created based on a particular hashtag. While the playlist is being played back, another user may record a new audio micropost and tag the post with the same hashtag. This new post may be automatically added to the playlist while the playlist is being played. The new audio micropost may be moved up towards the top of the playlist such that the new audio micropost may be played immediately after the audio micropost that is currently being played. In some instances, the new post may be played instantaneously such that the playlist module may cease to play the post that is currently being played back and start playing the new post instead.

In some embodiments, the communication module may be configured to communicate audio microposts via a user interface such that a user may view and/or listen to the audio microposts. In some embodiments, the communication module may be configured to share and/or publish audio microposts via various external content sources (e.g., social media providers, blogs, web sites, electronic files, etc.).

In some embodiments, the user interface module may be configured to present various displays for creating audio microposts via a user profile page, creating a discussion comprising a topic audio micropost and one or more comment audio microposts, and/or creating a playlist comprising a plurality of audio microposts based on a search query, and/or other displays.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
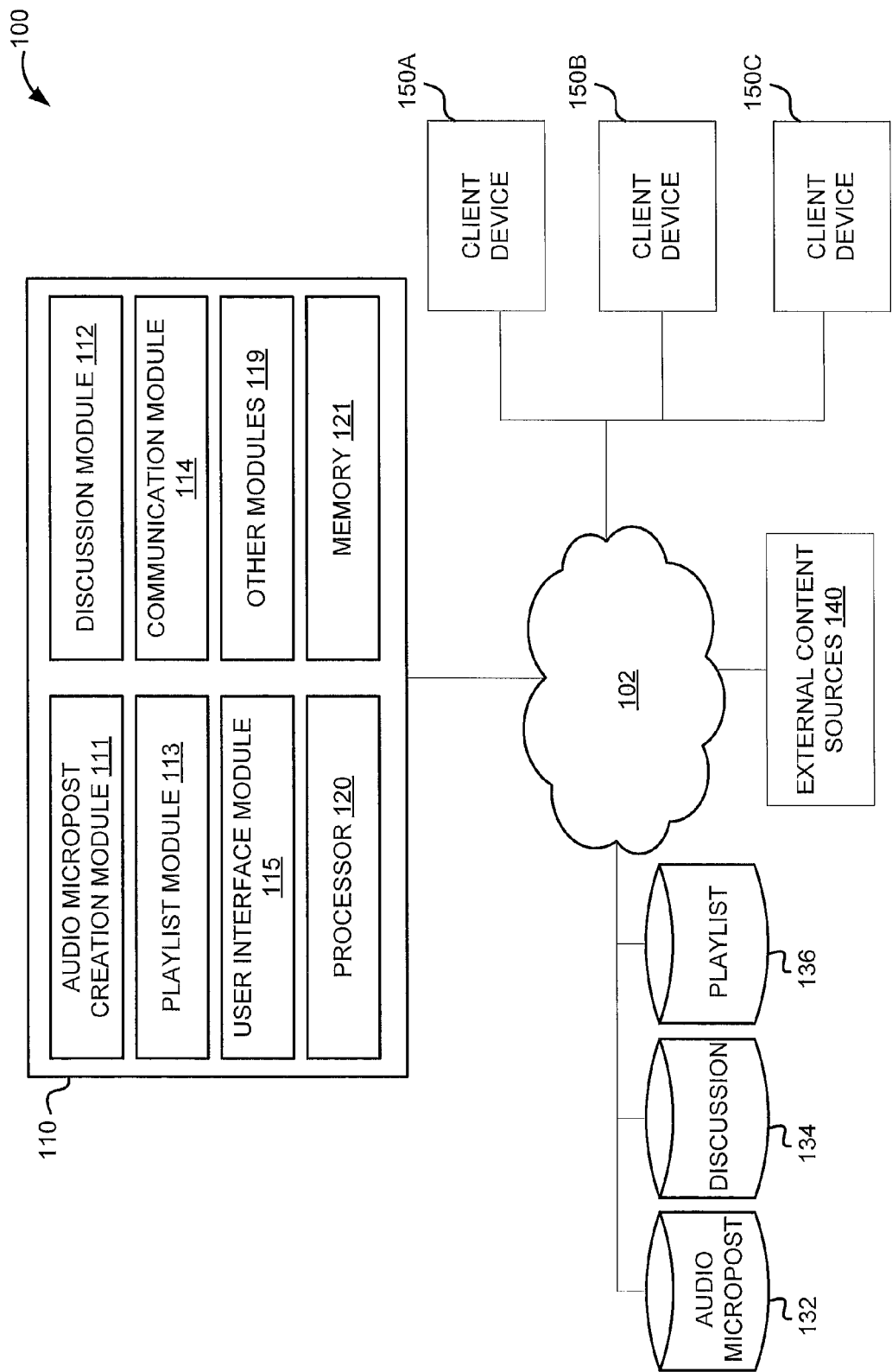
FIG. 1 illustrates a system of creating, managing, and publishing audio microposts, according to an aspect of the invention.

FIG. 1 illustrates a system 100 of creating, managing, and publishing audio microposts and creating a discussion and playlist based on the audio microposts. An audio micropost comprises audio content with running time less than a predetermined time limit. The audio micropost may be recorded and/or captured based on voice, speech, and/or other sound, which may be shared with and/or published to subscribers and/or other users. As used herein, an author of an audio micropost may comprise a user who creates the audio micropost by, for example, recording an audio input via an audio input device (e.g., a microphone). A subscriber (e.g., "friend," "follower," etc.) may comprise a user who has subscribed to audio microposts created by particular authors such that a new post created by the particular authors may be automatically published to the subscriber. The audio micropost may include and/or be associated with other types of content such as text, image (e.g., photo), video, a hyperlink, and/or hashtags (e.g., words or topics prefixed with the symbol "#").

System 100 may include a computer 110, external content source 140, client devices 150, and/or other components. In some embodiments, computer 110 may include one or more processors 120 configured to perform some or all of a functionality of a plurality of modules, which may be stored in a memory 121. For example, the one or more processors 120 may be configured to execute an audio micropost creation module 111, a discussion module 112, a playlist module 113, a communication module 114, a user interface module 115, and/or other modules 119.

Audio micropost creation module 111 may be configured to create an audio micropost, wherein the audio micropost comprises audio content with running time less than a predetermined time limit. The time limit may be set and/or updated based on user input. For example, when a system administrator and/or other user sets a specific time limit (e.g., the number of seconds, minutes, etc.), audio micropost creation module 111 may automatically stop recording audio content once the time limit is reached. In some embodiments, the audio micropost may be associated with a file size limit, which may be set and/or updated based on user input. For example, audio micropost creation module 111 may automatically stop recording audio content once the file size limit is reached.

In some embodiments, audio micropost creation module 111 may create an audio micropost by recording and/or capturing an audio input from an audio capture device (e.g., a microphone). Audio micropost creation module 111 may receive an audio input such as voice, speech, and/or other sound via the audio capture device. In some embodiments, the audio micropost may be created by uploading and/or importing an existing audio content to the system. The created audio micropost may be edited (e.g., shortened by removing a portion of the recorded content, adjusting the volume, etc.), deleted, and/or posted to a user profile page associated with the author who created the audio micropost. Users may copy and/or repost to their respective user profile page the audio micropost created and/or posted by another user, which is referred as an "Echo" or "Echoing." User and/or a selected group of users may create comments under the audio micropost. Comments may comprise textual, video, image, and/or audio content and/or other content. In some embodiments, users may create a comment that may comprise an audio micropost. The comment created in the form of audio micropost may be referred to as a "comment post" as discussed in detail herein with respect to discussion module 112.

In some embodiments, audio micropost creation module 111 may tag the audio micropost with one or more metadata tags including identifications of the author, identifications of other users (e.g., users who are mentioned in the post, who participated in creating the post, etc.), date/time information (e.g., the date/time of creation, modification, and/or update, the date/time last played, etc.), geographic location information (e.g., a geotag), keywords, hashtags, title, description, run time length, file size, metadata related to popularity such as the number of "likes" and/or votes (e.g., the number of times the post was "liked" by other users), the number of listens (e.g., the number of time the post was played by other users), the number of comments, and/or other metadata. A plurality of audio microposts may be ranked and/or sorted based on any one or more of the metadata tags. For example, a user may prefer a timeline view for his/her user profile page where the timeline view arranges the audio microposts created and/or reposted by the user in a chronological order (e.g., from the latest post to the oldest post based on the creation time). The audio microposts and associated metadata tags may be maintained and/or stored in an audio micropost database 132.

Discussion module 112 may be configured to create a discussion based on a plurality of audio microposts. As used herein, the discussion may include a discussion thread which may comprise a series of audio microposts. The discussion may be related to a question, idea, subject matter, and/or other topics. The discussion may comprise a first audio micropost followed by one or more comments that may be created in the form of audio microposts (hereinafter, "comment posts"). The comment posts may be used to comment on and/or reply to the question posed in and/or the discussion topic related to the first audio micropost. As used herein, the first audio micropost may be referred to as a "topic post." For example, a user (e.g., a moderator) may create a new audio micropost that may suggest a discussion topic such as "What do you think about President Obama's Healthcare plan?" The user may also select an existing audio micropost as a topic post. Once the topic post has been identified and/or selected, this post may be played and/or listened to by the user's subscribers and/or other users. The users who listened to the topic post may share their thoughts and opinions about the topic by leaving comment posts in response to the topic post.

In some embodiments, discussion module 112 may generate an invitation message (in the form of an alert, notification, text message, email, etc.) that may invite subscribers and/or other users to add comments in the discussion. For example, when the user wants to encourage more users to participate in the discussion, the user may, via discussion module 112, send out an invitation message that may comprise a link to the discussion thread, the topic post, a link to the topic post, and/or other information related to the discussion. The recipients of the invitation message may listen to the topic post and/or other comment posts included in the discussion and/or create a comment post. Discussion module 112 may maintain and/or store the topic post and one or more comment posts associated with the topic post as a discussion thread in a discussion database 134. The discussion thread may be modified and/or updated as additional comment posts are received.

In some embodiments, discussion module 112 may be configured to manage user access control and/or an ability to add comment posts to the audio micropost, discussion thread, and/or discussion. The discussion may be classified as an open discussion and/or a closed discussion. The open discussion may open all audio microposts and/or other content of the discussion to subscribers and/or other users, allowing those users to freely access the discussion (e.g., listen to the posts in the discussion thread, repost a micropost from the discussion, "like" a micropost in the discussion, etc.). The users may also add comment posts to the open discussion. On the other hand, the closed discussion may restrict and/or limit the ability to add comment posts to the discussion to a specific group of users. While the ability to add comment posts may be restricted and/or limited to the specific group of users, one or more of the other access permissions (e.g., listen to the posts in the discussion thread, repost a micropost from the discussion, "like" a micropost in the discussion, etc.) may be granted to one or more other subscribers and/or other users. In some embodiments, the ability to add a comment post to the audio micropost may be disabled such that no users may leave comments for the audio micropost.

In some embodiments, discussion module 112 may be configured to create a debaters list that comprises a list of participants and/or users (e.g., user identifications) who may be granted a permission to add comment posts to the closed discussion. The debaters list may be useful when two or more participants want to engage in a private debate in order to keep the discussion focused. For example, a user (e.g., moderator) may create a discussion by identifying and/or selecting a topic post and/or identifying and/or selecting a debaters list (e.g., newly created list, pre-existing list, etc.) that may be associated with the discussion. Discussion module 112 may grant the permission to add comment posts to one or more participants and/or users identified in the debaters list. A user who is interested in participating in the discussion may make a request to add a comment post to the discussion. For example, the user may make an attempt to record a comment post and/or upload it to the discussion. Discussion module 112 may determine whether the user who made the request has the permission to add a comment post to the closed discussion by verifying whether the user belongs to the debaters list. If it is determined that the user has the appropriate permission, the user may be allowed to create a comment post in response to the topic post and/or add the comment post to the closed discussion. On the other hand, if it is determined that the user does not belong to the debaters list and thus does not have the permission to add a comment post, discussion module 112 may ignore the request to add a comment post.

In some embodiments, discussion module 112 may be configured to create an audience list that comprises a list of users (e.g., user identifications) who may be granted a permission to access the closed discussion (e.g., listen to the posts in the discussion thread, repost a micropost from the discussion, "like" a micropost in the discussion, etc.). For example, the users who are included in the audience list may listen to the posts in the discussion thread, repost a micropost from the discussion, and/or "like" a micropost in the discussion but may not be able to add comment posts to the closed discussion. The debaters list and/or audience list may be maintained and/or stored in discussion database 134.

In some embodiments, discussion module 112 may be configured to generate a private invitation message (in the form of an alert, notification, text message, email, etc.) that may be communicated and/or sent to particular subscribers and/or users who are included in the debaters list and/or audience list. The private invitation message may comprise a link to the discussion thread, the topic post, a link to the topic post, and/or other information related to the discussion. In some embodiments, the recipients of the private invitation message may be given the opportunity to accept or decline the invitation to the discussion. The private invitation message may comprise an option to "Accept" or "Decline" the invitation to the discussion. For example, once a user included in the debaters list accepts the invitation, the user may be automatically directed to the discussion and/or start recording a comment post which may be added to the discussion thread.

In some embodiments, subscribers and/or other users who may be interested in joining in the closed discussion as a debater and/or as a member of the audience may request the user (e.g., moderator) who created and/or manages the discussion for the appropriate permission. For example, a user who is not identified as one of the debaters in the debaters list for a particular closed discussion may send a request and/or message to the moderator of the discussion for his or her approval. If approved, the user may be added to the debaters list associated with the particular closed discussion.

In some embodiments, discussion module 112 may be configured to keep track of and/or determine debater performance of one or more debaters in the discussion. Debater performance of a particular debater may be determined based on, for example, the number of "likes" and/or votes and/or other popularity metadata associated with the microposts created by the debater in that discussion. In some embodiments, discussion module 112 may be configured to determine which debater "wins" the debate based on the debater performance. For example, the debater who has the highest number of "likes" and/or votes may be selected as the winner of the debate.

Playlist module 113 may be configured to create a playlist which may comprise a plurality of audio microposts. As used herein, a playlist may comprise a collection of audio microposts that are arranged in a particular order for playback. In some embodiments, playlist module 113 may apply a "Play- All" mode and/or a "Shuffle Play" mode. For example, in the "Play-All" mode, all of the audio microposts in the playlist may be automatically played back in the particular order as arranged in the playlist. In this example, the audio microposts in the playlist may be automatically played back-to-back. When the user selects the "Shuffle Play" mode, playlist module 113 may select and play the audio microposts in the playlist in a randomized order.

In some embodiments, playlist module 113 may be configured to create a playlist of audio microposts by using one or more playlist parameters. The one or more playlist parameters may be used to search for audio microposts to be added into the playlist and/or filter audio microposts into the playlist and/or out of the playlist. The playlist parameters may specify one or more metadata tags associated with audio microposts that should be used, individually or in combination, to search for audio microposts to be added into the playlist and/or filter audio microposts into the playlist and/or out of the playlist.

In some embodiments, playlist module 113 may identify and/or obtain a plurality of audio microposts to be included in the playlist based on a search query, wherein the search query may comprise one or more hashtags and/or keywords. An audio micropost may include and/or be associated with one or more hashtags, in which the "#" symbol and/or other predefined symbols may be used as a prefix to a brief phrase and/or keyword following after. Searching by a particular hashtag may retrieve a set of audio microposts that may contain the hashtag. As such, hashtags provide an easy way to group such audio microposts. In these embodiments, playlist module 113 may be configured to obtain a search query that may comprise one or more hashtags and/or keywords. For example, a user may formulate a search query based on one or more hashtags and/or keywords that may describe audio microposts of interest. Playlist module 113 may search in audio micropost database 132 for audio microposts that match and/or correspond to the search query. Playlist module 113 may obtain search results containing a plurality of audio microposts that may include and/or be associated with one or more hashtags and/or keywords that match and/or correspond to the search query. For example, after a user finishes recording a new audio micropost about the 2012 Presidential Debate, the user may denote this micropost with a hashtag such as "#2012PresidentialDebate." If the user is interested in listening to what others have to say about the 2012 Presidential Debate, the user may create, via playlist module 113, a search query containing the hashtag "#2012PresidentialDebate." In response to the search query, playlist module 113 may return one or more audio microposts containing the hashtag.

Audio microposts in a playlist may be arranged in a particular order for playback ("playback order"). In some embodiments, playlist module 113 may be configured to rank the plurality of audio microposts based on one or more ranking criteria and/or determine the playback order based on the ranking. The one or more ranking criteria to be used to rank the plurality of audio microposts may be automatically determined by the system and/or based on user input. The audio microposts may be ranked and/or sorted based on the one or more ranking criteria which may specify one or more metadata tags that should be used, individually or in combination, to rank the posts. The one or more ranking criteria may include the relevance of a hashtag and/or keyword associated with individual microposts to the search query, a creation time associated with the individual microposts, and/or other ranking criteria defined based on other metadata tags. For example, when the ranking criteria include date/time information (e.g., a creation time) related to individual audio microposts, the plurality of audio microposts to be included in a playlist may be arranged in a chronological order (e.g., from the latest post to the oldest post based on the creation time). In some embodiments, a user may change and/or re-configure the ranking criteria to modify and/or update the playback order. In some embodiments, the playback order may be modified and/or updated by moving an audio micropost upward towards the top of the playlist and/or downward towards the bottom of the playlist. As such, in the "Play-All" mode, the audio microposts may be played back according to the modified and/or updated playback order. In some embodiments, playlist module 113 may create a playlist comprising the plurality of audio microposts that may be arranged and/or sorted based on the determined playback order.

In some embodiments, playlist module 113 may create a playlist based on a discussion created by discussion module 113. Playlist module 113 may convert a discussion thread included in the discussion to a playlist such that the entire discussion may be played back-to-back in the "Play-All" mode, for example. In some embodiments, a playlist may be created and/or an existing playlist may be updated by adding and/or removing individual audio microposts into and/or out of the playlist. In some embodiments, the playlists created by playlist module 113 may be maintained and/or stored in a playlist database 136.

In some embodiments, playlist module 113 may be configured to determine whether a number of the plurality of audio microposts included in the playlist is greater than N, wherein N is a predefined integer. In some instances, N may be determined based on user input. If it is determined that the number of the plurality of audio microposts is indeed greater than N, playlist module 113 may select and/or play the Top N highest ranked audio microposts of the playlist. For example, playlist module 113 may automatically play, in the "Play-All" mode, the Top 20 highest ranked audio microposts of the playlist.

In some embodiments, while the audio microposts included in a playlist created based on a search query (containing hashtags and/or keywords) are being played back in the "Play-All" mode, any newly created and/or recorded audio micropost that may correspond to a particular hashtag and/or keyword specified in the search query may be automatically added to the playlist, moved up towards the top of the playlist, and/or instantaneously played back. For example, a user may select the "Play-All" mode to start playing the audio microposts included in the playlist which has been created based on the hashtag "#2012PresidentialDebate." While the playlist is being played back, another user may record a new audio micropost and tag the post with the same hashtag. This new post may be automatically added to the playlist while the playlist is being played. The new audio micropost may be moved up towards the top of the playlist such that the new audio micropost may be played immediately after the audio micropost that is currently being played. In some instances, the new post may be played instantaneously such that playlist module 113 may cease to play the post that is currently being played back and start playing the new post instead.

In some embodiments, communication module 114 may be configured to communicate audio microposts via a user interface such that a user may view and/or listen to the audio microposts. In some embodiments, communication module 114 may be configured to share and/or publish audio microposts via external content sources 140. External content sources 140 may comprise social media providers (e.g., Facebook, Twitter, Tumblr, etc.), blogs, web sites, electronic files (e.g., emails, articles, etc.), and/or other content sources. For example, an audio micropost may be embedded in an article published online.

In some embodiments, user interface module 115 may be configured to generate user interfaces that allow interaction with audio microposts, discussions, and/or playlists. For example, user interface module 115 may present various displays for creating audio microposts via a user profile page, creating a discussion comprising a topic audio micropost and one or more comment audio microposts, and/or creating a playlist comprising a plurality of audio microposts based on a search query, and/or other displays.

Figure 4:
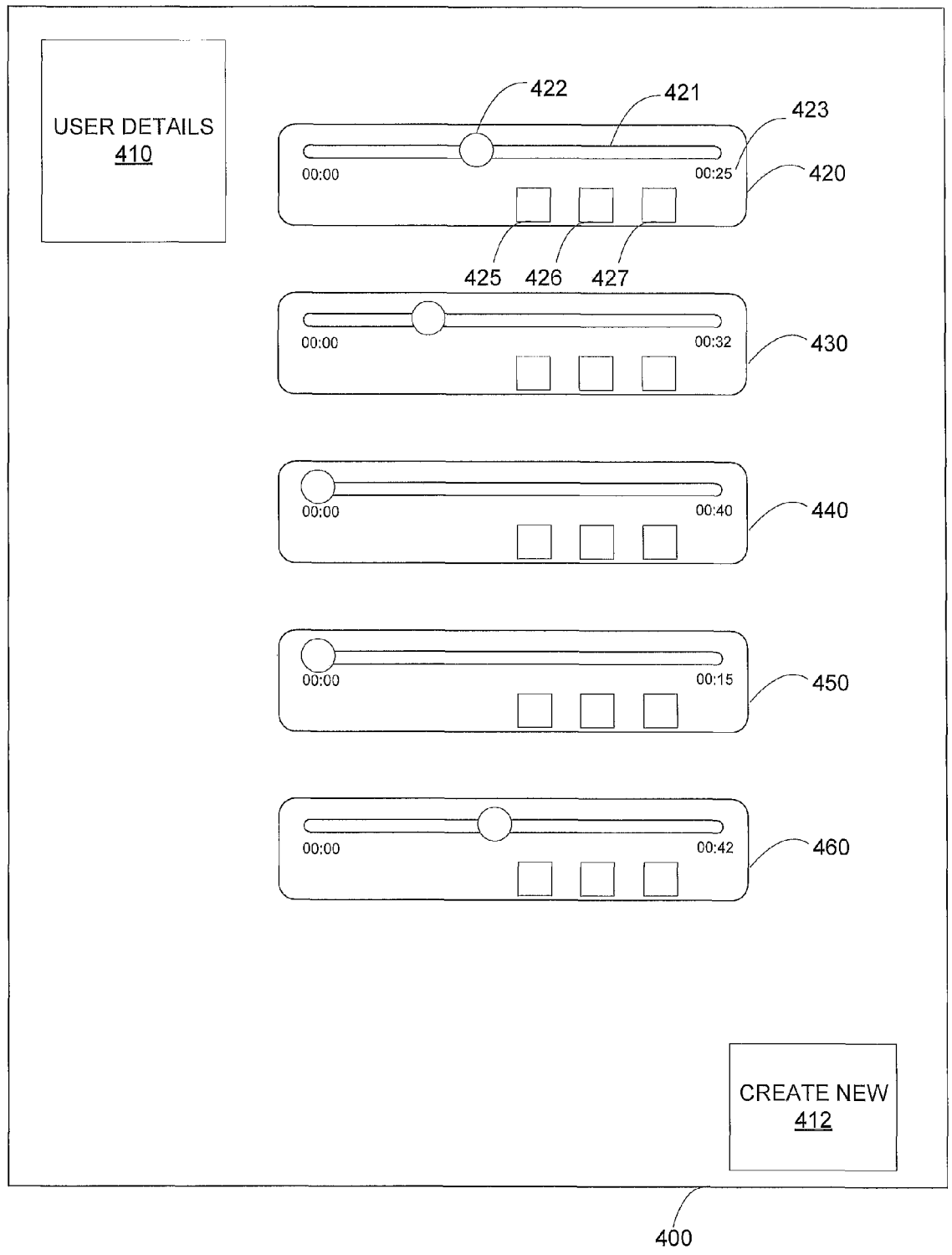
FIG. 4 illustrates a screenshot of an interface for creating audio microposts via a user profile page, according to an aspect of the invention.
Figure 5:
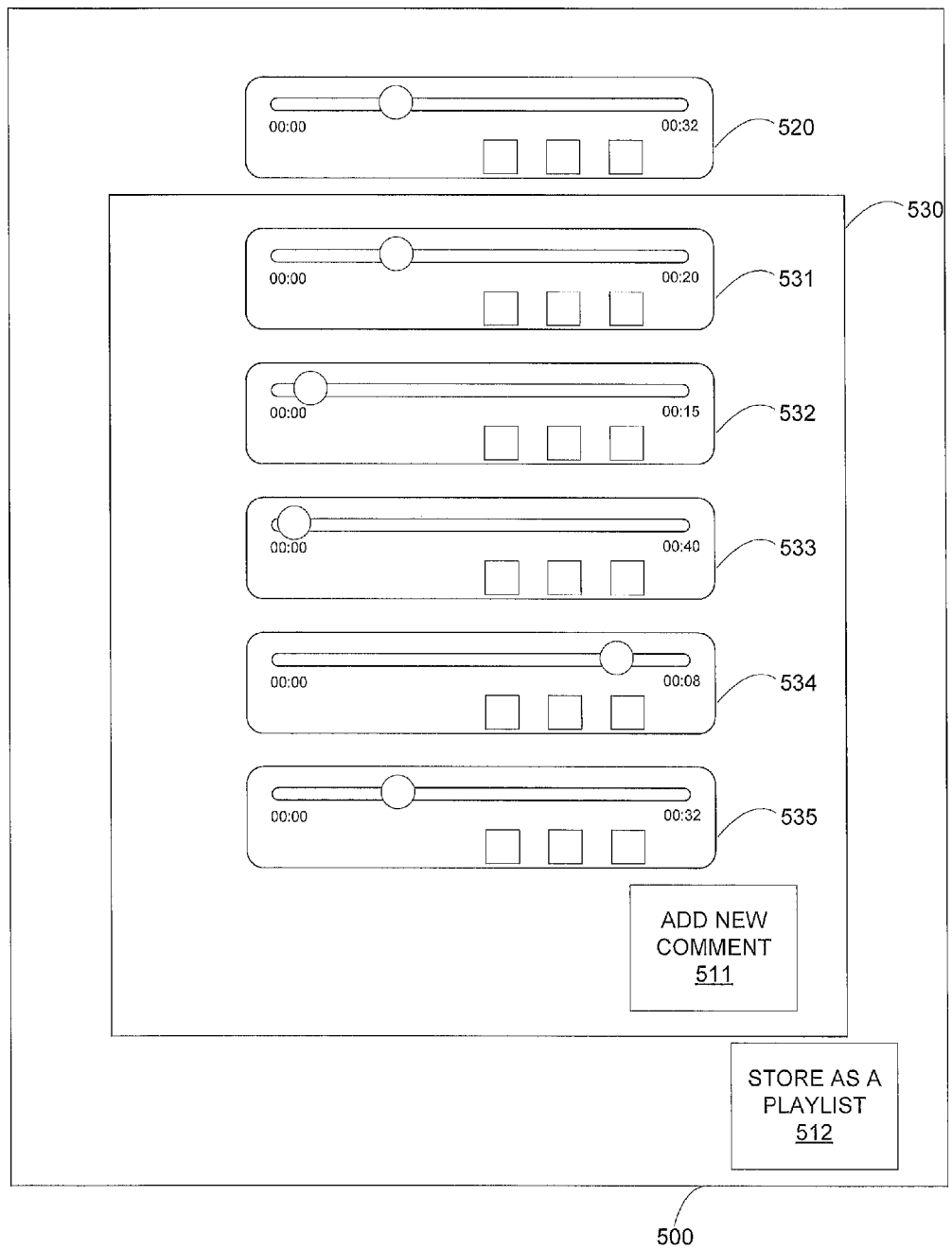
FIG. 5 illustrates a screenshot of an interface for creating a discussion comprising a topic audio micropost and one or more comment audio microposts, according to an aspect of the invention.
Figure 6:
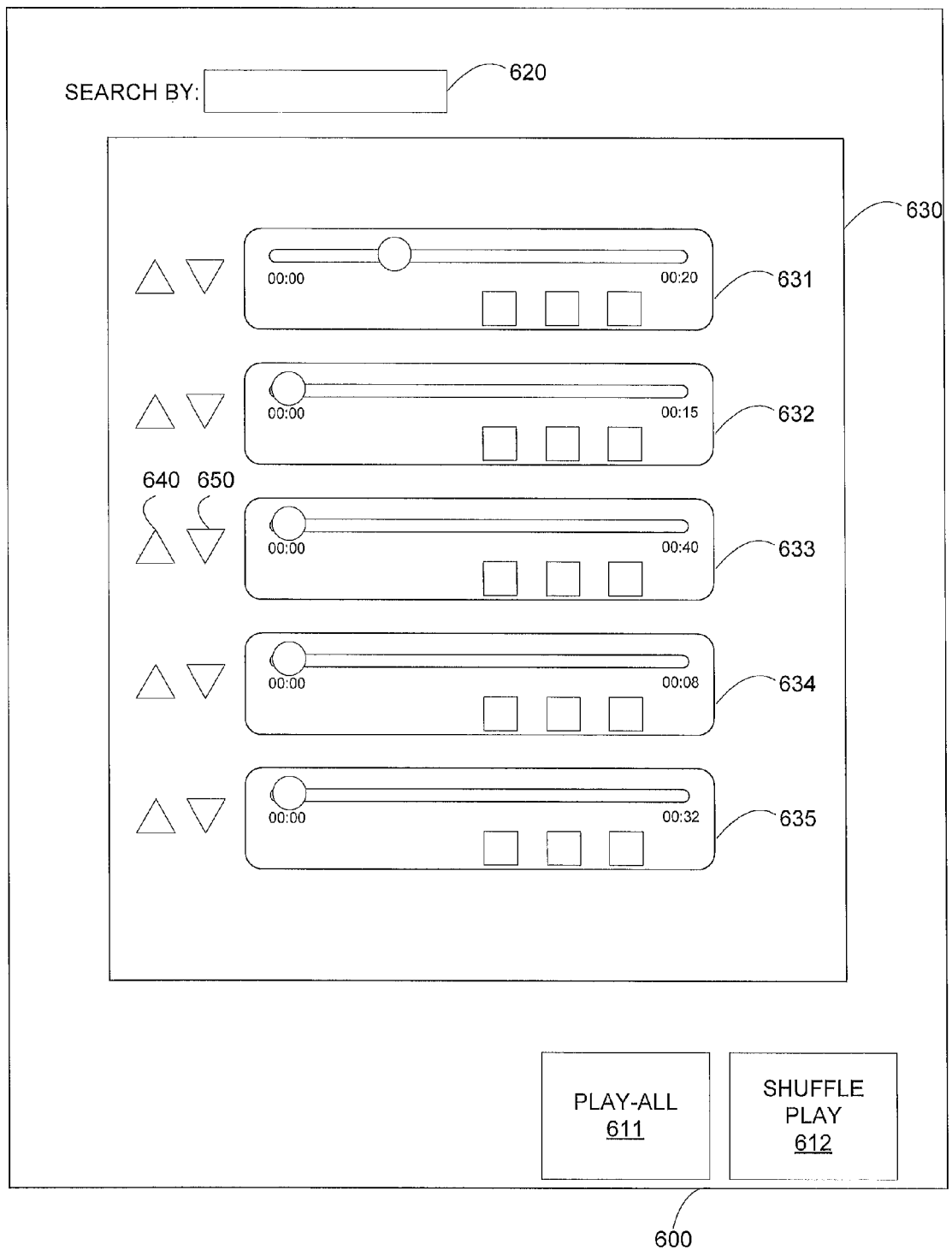
FIG. 6 illustrates a screenshot of an interface for creating a playlist comprising a plurality of audio microposts based on a search query, according to an aspect of the invention.

Exemplary screenshots of interfaces generated by user interface module 115 are illustrated in FIGS. 4-6.

Those having skill in the art will recognize that computer 110 and client device 150 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or client device 150. In one implementation, computer 110 and client device 150 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
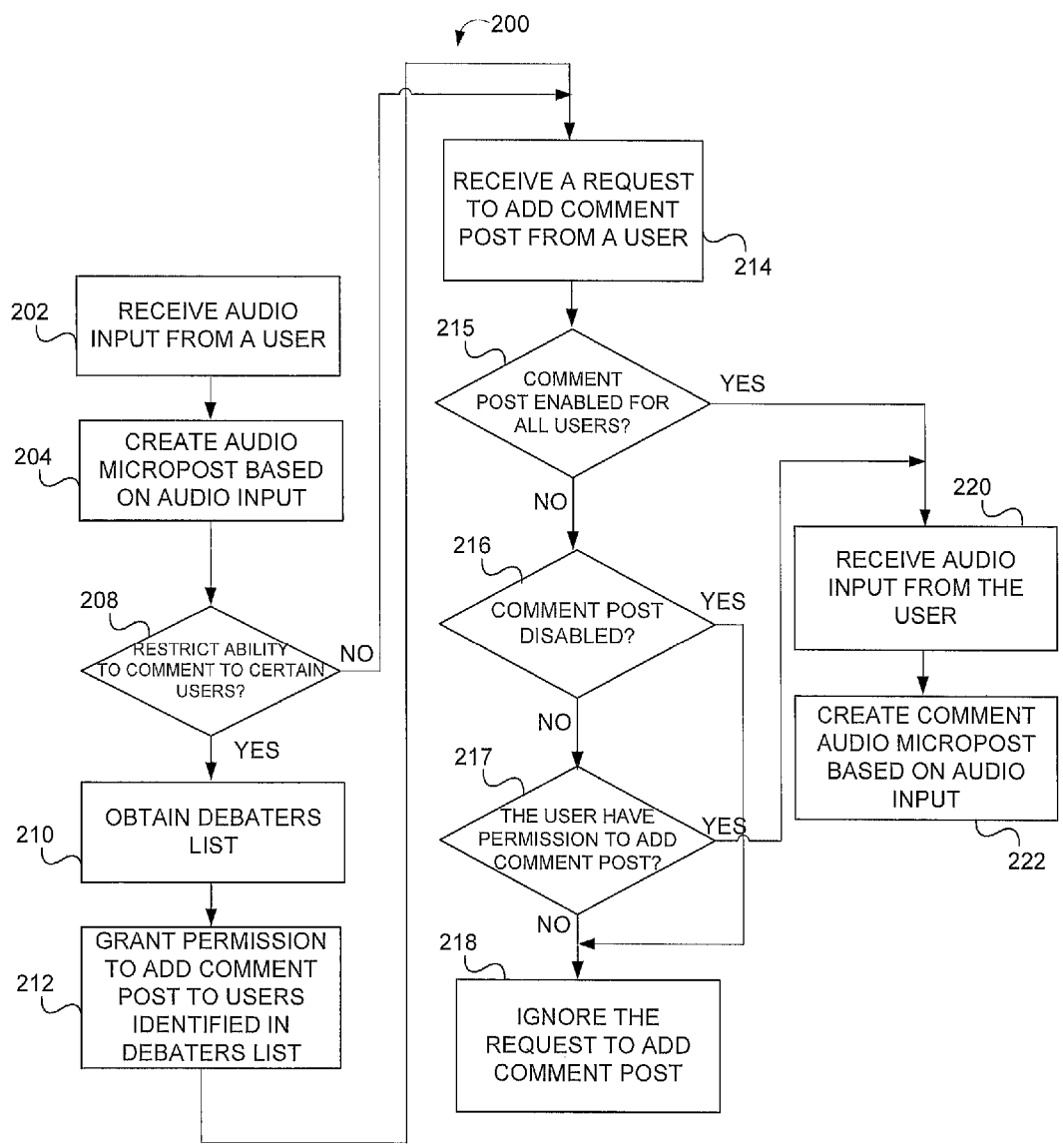
FIG. 2 illustrates a process of creating a discussion comprising a plurality of audio microposts, according to an aspect of the invention.

FIG. 2 illustrates a process 200 of creating a discussion comprising a plurality of audio microposts, according to an aspect of the invention. The various processing operations and/or data flows depicted in FIG. 2 (and in the other drawing figures) are described in greater detail herein. The described operations may be accomplished using some or all of the system components described in detail above and, in some embodiments, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Referring to FIG. 2, in an operation 202, process 200 may include receiving an audio input from a user. For example, a user (e.g., a moderator) may record an audio input that may suggest a discussion topic such as "What do you think about President Obama's Healthcare Plan?" In an operation 204, process 200 may include creating an audio micropost based on the audio input, which may be played and/or listened to by subscribers and/or other users.

In an operation 208, process 200 may include determining whether the ability to add comment posts to the audio micropost and/or the discussion thread should be restricted to a specified group of one or more users. For example, after creating a new audio micropost, a user may select the option to enable comment posts for all users such that all users may freely add comment posts to the audio micropost and/or the discussion thread (e.g., open discussion), to enable comment posts only to a specified group of users (e.g., closed discussion), and/or to disable comment posts such that no users may add comment posts to the audio micropost. If process 200 determines that the ability to add comment posts is not restricted to a specified group of users, process 200 may proceed to an operation 214. On the other hand, if process 200 determines that the ability to add comment posts is restricted to a specified group of users, process 200 may proceed to an operation 210.

In operation 210, process 200 may include identifying and/or obtaining a debaters list that comprises a list of participants who may be granted a permission to add comment posts to the closed discussion. In an operation 212, process 200 may include granting the permission to add comment posts to one or more participants identified in the debaters list.

In an operation 214, process 200 may include receiving a request to add a comment post from a user. For example, a user who is interested in participating in the discussion may make a request to add a comment post to the discussion. In an operation 215, process 200 may determine whether the comment post feature has been enabled for all users. If process 200 determines that the comment post feature has been enabled for all users, process 200 may proceed to an operation 220. On the other hand, if process 200 determines that the comment post feature has not been enabled for all users, process 200 may proceed to an operation 216. In operation 216, process 200 may determine that the comment post feature has been disabled. If process 200 determines that the comment post feature has been disabled, process 200 may include ignoring the request to add a comment post in an operation 218.

On the other hand, if process 200 determines that the comment post has not been disabled in operation 216, process 200 may proceed to an operation 218. In operation 218, process 200 may include determining whether the user who made the request has the permission to add a comment post to the discussion by verifying whether the user belongs to the debaters list. If process 200 determines that the user has the appropriate permission, process 200 may proceed to an operation 220. In operation 220, process 200 may include receiving an audio input from the user with the permission. In an operation 222, process 200 may include creating a comment post based on the received audio input and/or adding the comment post to the discussion. On the other hand, if process 200 determines that the user does not belong to the debaters list and thus does not have the permission to add a comment post, process 200 may ignore the request to add a comment post in operation 218.

Figure 3:
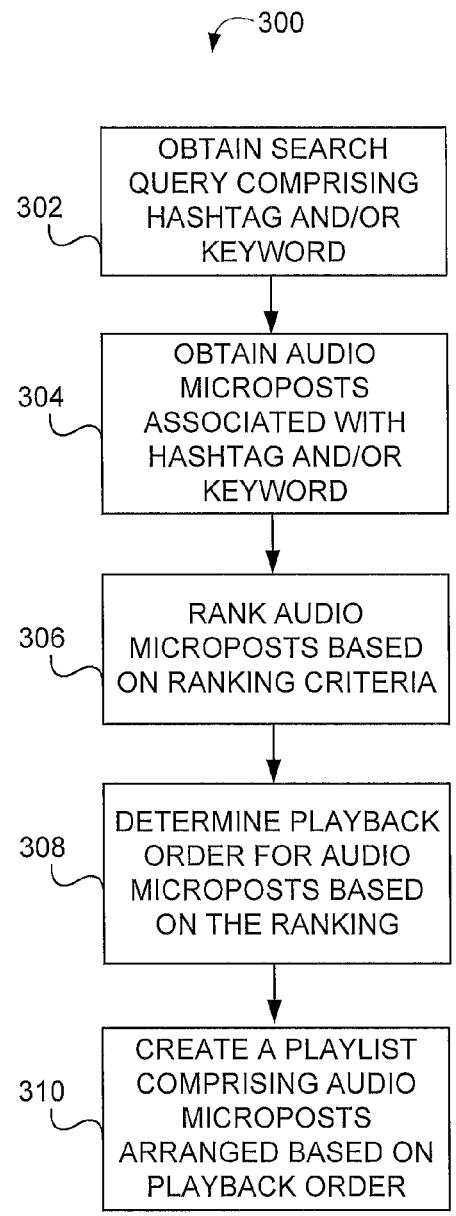
FIG. 3 illustrates a process of creating a playlist based on a search query, wherein the playlist comprising a plurality of audio microposts, according to an aspect of the invention.

FIG. 3 illustrates a process 300 of creating a playlist based on a search query, wherein the playlist comprising a plurality of audio microposts, according to an aspect of the invention.

In an operation 302, process 300 may include obtaining a search query that may comprise one or more hastags and/or keywords. For example, a user may formulate a search query based on one or more hashtags and/or keywords that may describe audio microposts of interest.

In an operation 304, process 300 may include obtaining search results containing a plurality of audio microposts that may include and/or be associated with one or more hashtags and/or keywords that match and/or correspond to the search query. For example, after a user finishes recording a new audio micropost about the 2012 Presidential Debate, the user may denote this micropost with a hashtag such as "#2012PresidentialDebate." If the user is interested in listening to what others have to say about the 2012 Presidential Debate, the user may create a search query containing the hashtag "#2012PresidentialDebate." In response to the search query, process 300 may return one or more audio microposts containing the hashtag.

In an operation 306, process 300 may include ranking the plurality of audio microposts based on one or more ranking criteria. The audio microposts may be ranked and/or sorted based on the one or more ranking criteria which may specify one or more metadata tags that should be used, individually or in combination, to rank the posts. The one or more ranking criteria may include the relevance of a hashtag and/or keyword associated with individual microposts to the search query, a creation time associated with the individual microposts, and/or other ranking criteria defined based on other metadata tags. For example, when the ranking criteria include date/time information (e.g., a creation time) related to individual audio microposts, the plurality of audio microposts to be included in a playlist may be arranged in a chronological order (e.g., from the latest post to the oldest post based on the creation time).

In an operation 308, process 300 may include determining the playback order based on the ranking determined in operation 306. In an operation 310, process 300 may include creating a playlist comprising the plurality of audio microposts that may be arranged and/or sorted based on the playback order determined in operation 308.

FIG. 4 illustrates a screenshot of an interface 400 for creating audio microposts via a user profile page, according to an aspect of the invention. The screenshots illustrated in FIG. 4 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Referring to FIG. 4, interface 400 may illustrate the user profile page that may be a web site page a user may access to view and/or listen to audio microposts created and/or reposted by the user and/or by his/her subscribers. Interface 400 may include a user details element 410 that may display information identifying the user who may be associated with the user profile page. The identification information may include a user profile picture, user ID, user name, birthday, etc.

Interface 400 may include audio micropost elements 420, 430, 440, 450, and 460. Audio micropost elements 420, 430, 440, 450, and 460 may be created and/or reposted by the user and/or by his/her subscribers. Interface 400 may include a "Create New" element 412 which may be used to record a new audio micropost. The newly recorded audio micropost may be uploaded to and/or displayed in the user profile page. Audio microposts elements 420, 430, 440, 450, and 460 may be displayed in a timeline view. The timeline view may arrange the audio microposts in a chronological order (e.g., from the latest post to the oldest post based on the creation time).

As illustrated, for each audio micropost (e.g., audio micropost element 420), interface 400 may include a time duration slider bar 421 having a movable widget 422 that may be moved along time duration slider bar 421 to indicate a playback point in time within the total time length (e.g., a run time length 423) of the micropost. Movable widget 422 may be moved along time duration slider bar 421 to navigate within the audio micropost to a particular point in time. For example, a user may specify a specific playback point in time to seek to, or jump to, within the micropost by moving movable widget 422 along time duration slider bar.

Interface 400 may include a play element 425 which, when selected, may cause audio micropost 420 to be reproduced and/or played back. A stop element 426 may, when selected, cause the playing to stop. Interface 400 may include a delete element 427 which, when selected, may cause audio micropost 420 to be deleted.

FIG. 5 illustrates a screenshot of an interface 500 for creating a discussion comprising an audio micropost and one or more comment audio microposts, according to an aspect of the invention.

Interface 500 may include an audio micropost 520. Interface 500 may include a comment section 530 which may include a plurality of comment audio microposts 531, 532, 533, 534, and 535. A user may add, with an appropriate permission, a new comment post to the discussion by selecting an "Add New Comment" element 511. The newly added comment post may be displayed in comment section 530.

Interface 500 may include a "Store as a Playlist" element 512 which may cause a discussion thread comprising audio micropost 520 and comment audio microposts 531, 532, 533, 534, and 535 to be converted to a playlist such that the entire discussion may be played back-to-back in the "Play-All" mode, for example.

FIG. 6 illustrates a screenshot of an interface 600 for creating a playlist comprising a plurality of audio microposts based on a search query, according to an aspect of the invention.

Interface 600 may include an input field 620 that may receive a search query that may comprise one or more hashtags and/or keywords. The search query entered via input field 620 may be used to retrieve and/or obtain a plurality of audio microposts (e.g., audio micropost elements 631, 632, 633, 634, and 635) that may include and/or be associated with one or more hashtags and/or keywords that may match and/or correspond to the search query. The search results including the plurality of audio microposts may be arranged in a particular playback order based on one or more ranking criteria, as discussed in more detail herein with respect to playlist module 113. Interface 600 may include a playlist 630 which may include audio microposts elements 631, 632, 633, 634, and 635 that may be arranged in the particular playback order.

Interface 600 may include a "Play-All" element 611 and a "Shuffle Play" element 612. "Play-All" element, when selected, may cause all of audio micropost elements 631, 632, 633, 634, and 635 in playlist 630 to be automatically played back-to-back in the particular play order as arranged in playlist 630. When "Shuffle Play" element 612 is selected, playlist module 113 may select and play audio micropost elements 631, 632, 633, 634, and 635 in playlist 630 in a randomized order.

Interface 600 may include a "Move Up" element 640 and a "Move Down" element 650, which may be used to modify and/or update the playback order. For example, when "Move Up" element 640 that may be located next to audio micropost element 633 is selected, audio micropost element 633 may move upward towards the top of the playlist such that audio micropost 633 may be placed above audio micropost 632. Selecting "Move Down" element 650 may cause audio micropost 633 to move downward towards the bottom of the playlist such that audio micropost 633 may be placed below audio micropost 634, for example.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for creating a discussion comprising a plurality of audio microposts, the method being implemented in a computer system that includes one or more physical processors programmed by computer program instructions, the method comprising:
storing, by the computer system, a plurality of user lists, wherein the plurality of user lists comprises a first user list comprising a first set of users and a second user list comprising a second set of users;
receiving, by the computer system, an audio input comprising a voice message produced from a first user;
creating, by the computer system, an audio micropost based on the audio input, wherein the audio micropost has a run time length that is less than a predetermined time limit;
creating, by the computer system, a first discussion based on the audio micropost;
receiving, by the computer system from the first user, a selection of the first user list from the plurality of user lists;
authorizing, by the computer system, the first set of users to add a comment audio micropost to the first discussion based on the selection of the first user list;
receiving, by the computer system, a request to add a first comment audio micropost to the first discussion from a second user;
determining, by the computer system, whether the second user is authorized to add the first comment audio micropost to the first discussion;
adding, by the computer system, the first comment audio micropost to the first discussion based on determining that the second user is authorized to add the first comment audio micropost to the first discussion, wherein the first discussion comprises the audio micropost and the first comment audio micropost; and
creating, by the computer system, a playlist based on the first discussion, wherein the playlist arranges the audio micropost and the first comment audio micropost in a particular playback order.

2. The method of claim 1, wherein the audio input is received via a microphone.

3. The method of claim 1, wherein the first comment audio micropost has a second run time length that is less than the predetermined time limit.

4. The method of claim 1, the method further comprising:
generating an invitation inviting the first set of users to add a comment audio micropost to the first discussion, wherein the invitation comprises an option to accept or decline the invitation to the first discussion;
sending the invitation to the first set of users; and
authorizing one or more users in the first set of users who have accepted the invitation to add a comment audio micropost to the first discussion.

5. The method of claim 1, wherein the second user adds a second comment audio micropost to the first discussion, the method further comprising:
determining a first level of popularity associated with the first audio comment micropost and a second level of popularity associated with the second audio comment micropost;
determining a performance score for the second user based on the first level of popularity and the second level of popularity.

6. The method of claim 1, the method further comprising:
receiving, from the first user, a selection of the first user list and the second user list from the plurality of user lists; and
authorizing the first set of users and the second set of users to add a comment audio micropost to the first discussion based on the selection of the first user list and the second user list.

7. The method of claim 1, wherein the first discussion is publicly accessible by users who are not included in the first user list such that the users who are not included in the first user list are allowed to view and listen to the audio micropost and all of the comment audio microposts in the first discussion.

8. The method of claim 1, the method further comprising:
playing the audio micropost and the first comment audio micropost in the discussion according to the particular playback order, wherein the audio micropost and the first comment audio micropost in the discussion are automatically played back-to-back during the playing.

9. The method of claim 8, the method further comprising:
adding a new comment audio micropost to the discussion; and
adding the new audio micropost to the playlist during the playing.

10. The method of claim 9, the method further comprising:
moving the new comment audio micropost up towards the top of the playlist; and
playing the new comment audio micropost immediately after a current audio micropost being played.

11. The method of claim 9, the method further comprising ceasing to play a current audio micropost being played; and
playing the new comment audio micropost immediately after the ceasing.

12. The method of claim 1, wherein creating the playlist comprises:
ranking the audio micropost and the first comment audio micropost in the discussion based on one or more ranking criteria; and
determining the particular playback order based on the ranking.

13. The method of claim 12, wherein the one or more ranking criteria comprise a creation time associated with the audio micropost and the plurality of comment audio microposts in the discussion.

14. The method of claim 1, wherein creating the playlist comprises:
manipulating the playlist based on a user input.

15. A system for creating a discussion comprising a plurality of audio microposts, the system comprising:
a computer system comprising one or more physical processors programmed by computer program instructions which cause the computer system to:
store a plurality of user lists, wherein the plurality of user lists comprises a first user list comprising a first set of users and a second user list comprising a second set of users;
receive an audio input comprising a voice message produced from a first user;
create an audio micropost based on the audio input, wherein the audio micropost has a run time length that is less than a predetermined time limit;
create a first discussion based on the audio micropost;

receive, from the first user, a selection of the first user list from the plurality of user lists;
authorize the first set of users to add a comment audio micropost to the first discussion based on the selection of the first user list;
receive a request to add a first comment audio micropost to the first discussion from a second user;
determine whether the second user is authorized to add the first comment audio micropost to the first discussion;
add the first comment audio micropost to the first discussion based on determining that the second user is authorized to add the first comment audio micropost to the first discussion, wherein the first discussion comprises the audio micropost and the first comment audio micropost; and
create a playlist based on the first discussion, wherein the playlist arranges the audio micropost and the first comment audio micropost in a particular playback order.

16. The system of claim 15, wherein the audio input is received via a microphone.

17. The system of claim 15, wherein the first comment audio micropost has a second run time length that is less than the predetermined time limit.

18. The system of claim 15, wherein the computer system is further programmed to:
generate an invitation inviting the first set of users to add a comment audio micropost to the first discussion, wherein the invitation comprises an option to accept or decline the invitation to the first discussion;
send the invitation to the first set of users; and
authorize one or more users in the first set of users who have accepted the invitation to add a comment audio micropost to the first discussion.

19. The system of claim 15, wherein the second user adds a second comment audio micropost to the first discussion, and wherein the computer system is further programmed to:
determine a first level of popularity associated with the first audio comment micropost and a second level of popularity associated with the second audio comment micropost;
determine a performance score for the second user based on the first level of popularity and the second level of popularity.

20. The system of claim 15, wherein the computer system is further programmed to:
receive, from the first user, a selection of the first user list and the second user list from the plurality of user lists; and
authorize the first set of users and the second set of users to add a comment audio micropost to the first discussion based on the selection of the first user list and the second user list.

21. The system of claim 15, wherein the first discussion is publicly accessible by users who are not included in the first user list such that the users who are not included in the first user list are allowed to view and listen to the audio micropost and all of the comment audio microposts in the first discussion.

22. The system of claim 15, wherein the computer system is further programmed to:
play the audio micropost and the first comment audio micropost in the discussion according to the first playback order, wherein the audio micropost and the first comment audio micropost in the discussion are automatically played back-to-back during the playing.

23. The system of claim 22, wherein the computer system is further programmed to:
add a new comment audio micropost to the discussion; and
add the new audio micropost to the playlist during the playing.

24. The system of claim 23, wherein the computer system is further programmed to:
move the new comment audio micropost up towards the top of the playlist; and
play the new comment audio micropost immediately after a current audio micropost being played.

25. The system of claim 23, wherein the computer system is further programmed to:
cease to play a current audio micropost being played; and
play the new comment audio micropost immediately after the ceasing.

26. The system of claim 15, wherein to create the playlist, the computer system is further programmed to:
rank the audio micropost and the first comment audio micropost in the discussion based on one or more ranking criteria; and
determine the particular playback order based on the ranked audio micropost and the first comment audio micropost.

27. The system of claim 26, wherein the one or more ranking criteria comprise a creation time associated with the audio micropost and the first comment audio micropost in the discussion.

28. The system of claim 15, wherein to create the playlist, the computer system is further programmed to:
manipulate the playlist based on a user input.

* * * * *